(No Model.) 2 Sheets—Sheet 1.
W. A. LEE.
IRRIGATING APPARATUS.
No. 547,123. Patented Oct. 1, 1895.
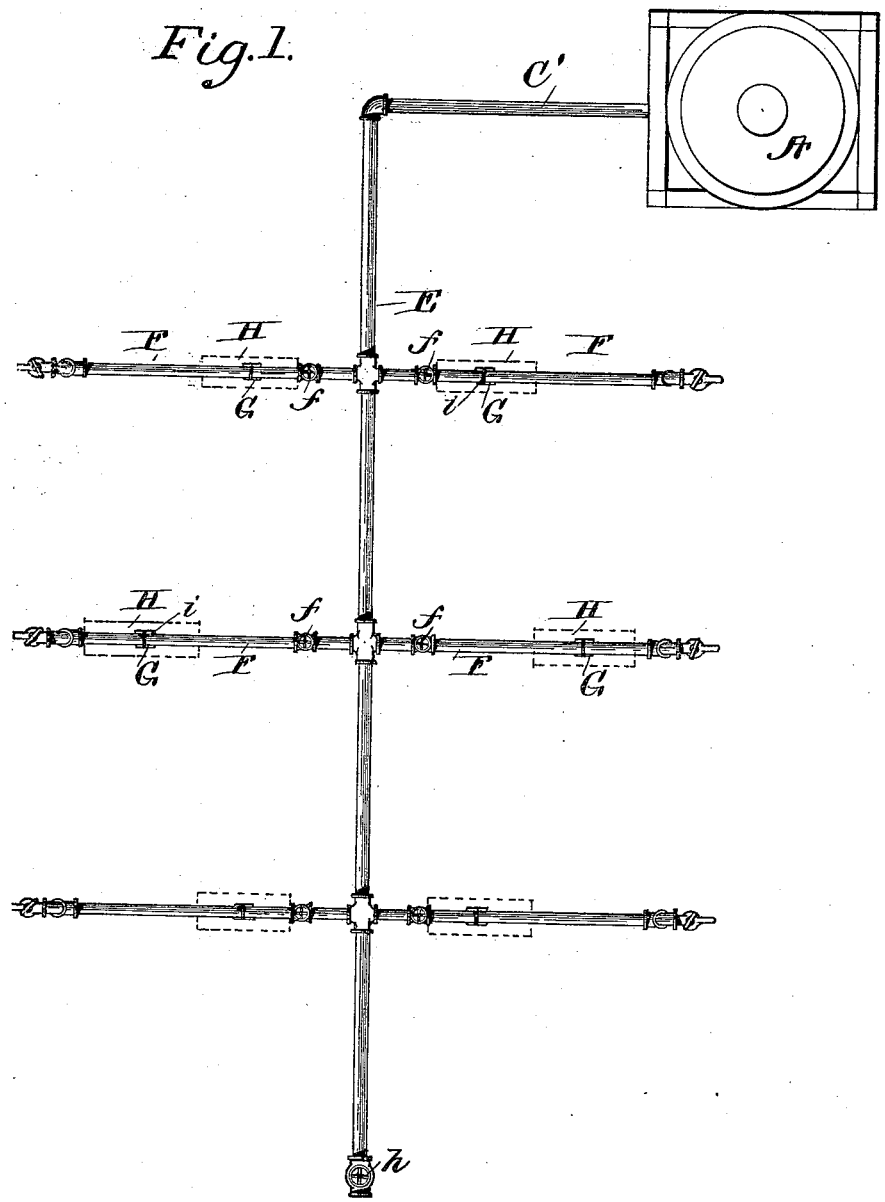

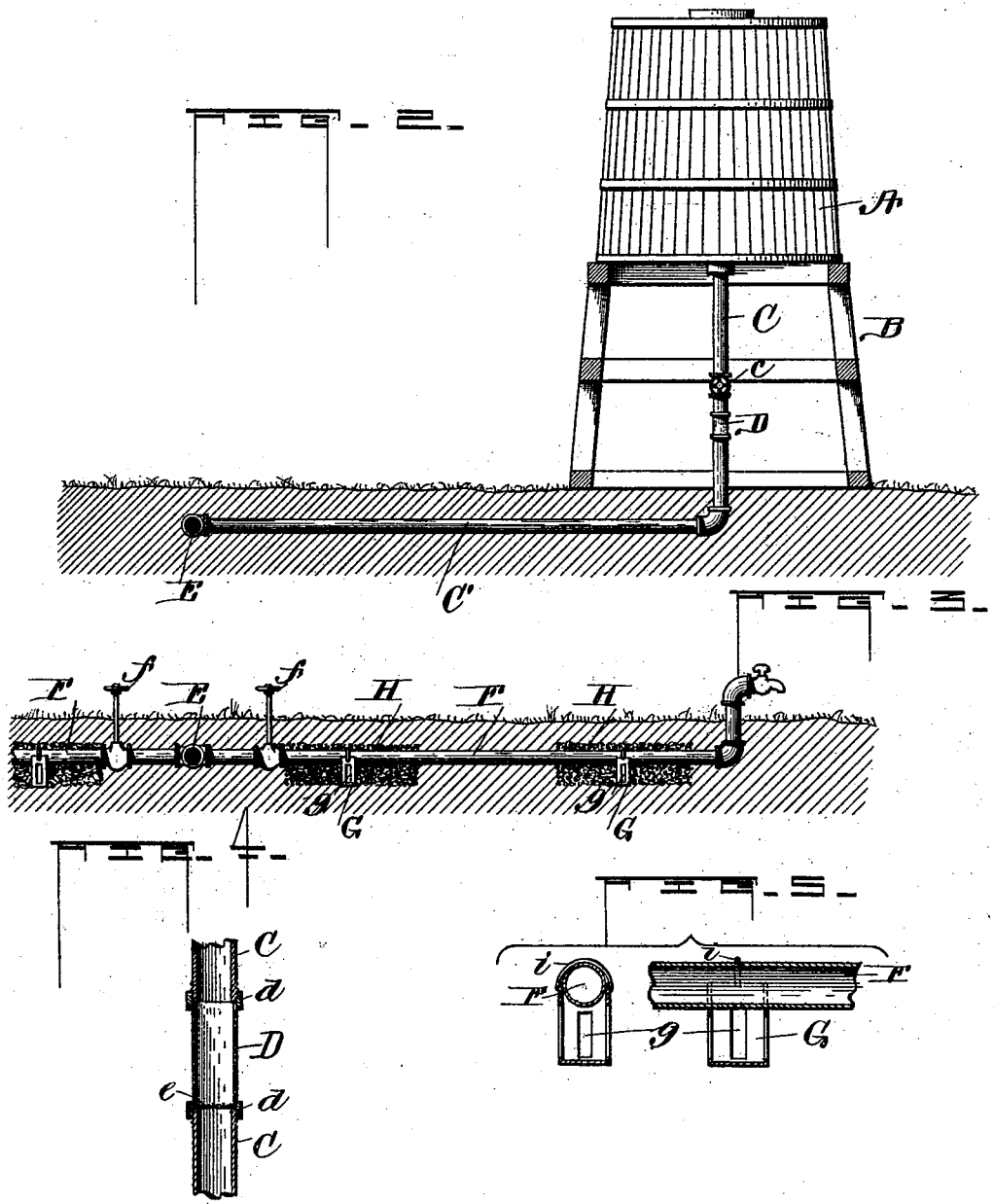

UNITED STATES PATENT OFFICE.

WILLIAM A. LEE, OF PEORIA, ILLINOIS.

IRRIGATING APPARATUS.

SPECIFICATION forming part of Letters Patent No. 547,123, dated October 1, 1895.

Application filed May 15, 1895. Serial No. 549,366. (No model.)

*To all whom it may concern:*

Be it known that I, WILLIAM A. LEE, a citizen of the United States, residing at Peoria, in the county of Peoria and State of Illinois, have invented certain new and useful Improvements in Irrigating Apparatus; and I do hereby declare that the following is a full, clear, and exact description of the invention, which will enable others skilled in the art to which it appertains to make and use the same.

My invention relates to certain new and useful improvements in irrigating systems, by means of which a system is provided that is very efficient for the purpose designed.

More particularly my invention relates to an underground system of irrigation; and it consists, essentially, in the provision of a series of pipes to which water is supplied either from a tank or other suitable source, the preparation of the ground in connection with the said pipes to accomodate the same to more efficiently perform the functions of irrigation, and of certain other details of construction in connection with the system hereinafter more particularly enumerated.

That my invention may be more fully understood, reference is had to the accompanying drawings, in which—

Figure 1 is a plan view of the system. Fig. 2 is a partial section showing a part of the system. Fig. 3 is a detail view showing the manner in which the pipes of the system are carried underneath the surface of the ground. Fig. 4 is a detailed view of the water gage and strainer in connection with lead-pipes of the system. Fig. 5 shows cross-sections through pipes of the system and slotted cap or guard in connection therewith.

In the figures, A refers to the tank; B, to a frame structure for supporting the same. C is a vertical pipe leading to the tank. *c* is a valve carried in connection with said pipe, provided to control the flow of water from the tank. D is a section of a glass tube carried in connection with the vertical pipe C, in the manner best shown in Fig. 4 of the drawings, in which said figure *d* represents threaded bands for connecting the glass tube with the pipes, and *e* is a strainer carried across the opening in the pipe at the base of the section of glass tubing. C' is a continuation of the piping, which may run underground in the manner shown. E is the main lead-pipe of the system, which is carried underneath the surface of the ground at a depth of about sixteen inches or at any other particularly-desired depth. F F are laterals extending out from the said lead-pipe, the same also being carried beneath the surface of the ground at the same depth, unless otherwise desired, as the said lead-pipe, there being provided in connection with the said lead-pipe the valve *f* for controlling the flow of water therein, there being provided in connection with the extremity of each of the said laterals a sort of faucet or cock, which is carried above the ground, which provides a small outlet-opening for air, as is necessary in the effective operation of the system. Each of these said laterals is provided at intervals of about eight feet apart with perforations in the lower part thereof of fairly-good size, and in connection with the said pipes and carried immediately over said perforations there are provided the depending caps G, provided with slots *g*, which are secured to the said laterals by means of wires, as *i i*, said wires being connected with the said caps and carried over the top of the pipes in the manner shown and particularly well illustrated in Fig. 5. The object of the said caps being provided in connection with this system is to prevent dirt, gravel, or any other matter from obstructing the flow of water through the perforations to the pipes, which obstruction would result from absolute contact of the surface of the pipe with the dirt or gravel of the soil in which it is carried. H H are pockets in the ground in which the system is laid and are provided at distances of about four feet apart and are about four feet long and sixteen inches wide generally; but they may be made of any size desired, these said pockets being filled with gravel extending to the bottom of trenches dug for the pipes and to a point a short distance above the pipes, and over the said pockets it is filled in with the usual soil or dirt, these said pockets being placed at intervals along the whole length of the laterals laid and at uniform distances apart, there always intervening between the said pockets a stretch of solid ground, and it is purposed that the water shall be conveyed to these pockets to their full capacity, and from thence it will seep through the soil and thoroughly irrigate the same, rendering it admirably fitted for propagation. At the extremity of the main lead-pipe E there is provided an outlet, which is guarded by the valve $h$, from which said outlet-opening the complete stystem may be drained, the same being provided with a slight incline to facilitate in the flow toward the extremity of the said pipe. The flow of water through any particular lateral may be cut off by means of the valve $f$ when it is desired that water be not supplied to any particular part of the system or when it has become sufficiently irrigated.

The operation of this system for practical use is apparent. It is first necessary that a supply shall be established, which may be from a tank, a reservoir, or from any other suitable source; further, that the system of pipes shall be laid a proper depth within the soil, that the pockets shall be formed and filled with gravel, that the caps or guards shall be placed over the perforations in the pipe, and as the said caps are provided with slots the water from the pipe will flow freely into the pockets; but because of the said caps dirt, gravel, and other substances that would naturally stop up the holes in the pipe will not pass into the said caps, so that a regular and steady flow of water therefrom shall be assured.

The glass tube and strainer provided in connection with the system are features of especial usefulness and advantage, inasmuch as the strainer prevents the passage of matter that would tend to interrupt the proper working of the system and the glass tube will enable the operator of the system to note any accumulations within the tube and upon the strainer, and the glass tube is made detachable, so that any foreign matter collecting therein may be removed.

In operating the system, and we will assume for convenience that the supply is from the tank shown in the drawings, and all of the valves having been opened excepting the one at the extremity of the lead-pipe, which is de-closed, and water being permitted to flow, it will pass down through the pipe C, through the glass tube and strainer therein, and from thence through the lead-pipe and laterals and will cause a flow of water into the pockets G, and from thence the water will percolate through the soil, thoroughly irrigating the same. The valves at the extremities of the laterals, being opened, will permit the escape of air from the pipes, which escape of air is essential, as water will not traverse the full length of the laterals unless the air is permitted thus to escape.

I may use my system for the purpose of drainage, if desired, by cutting off the supply of water and leaving the pipes empty, as the gravel pockets would naturally collect excesses of water in the soil and would feed it out naturally through the pipes and run it out at the end of the lead-pipe, as the inclination of the system, as previously stated, will accommodate such flow.

I may use my system for the purpose of heating the surface of the ground, and in order to do this I simply inject steam into the pipes and cause the same to pass therethrough, the gravel pockets absorbing and retaining the heat to a great extent and radiating it out gradually to maintain a constant and regular temperature of the soil.

I am aware that other systems of irrigation have been provided; but I am not aware of any system being used in connection with which there is provided a strainer and glass tube to insure the rejection of all foreign matter that would tend to clog the pipe, and I am not aware of a system being employed in which the laterals or feeding-pipes terminate with an escape-valve; nor am I aware of any system being used in which a cap or guard was provided over the perforations in the pipe to prevent the obstruction of said perforations by accumulations of dirt or the contact therewith of some foreign substance; nor am I aware of the provision in connection with the soil in which the system is laid of gravel pockets for receiving and storing large quantities of water to be fed out gradually by percolation through the soil.

Having thus fully described my invention, what I claim, and desire to secure by Letters Patent, is—

1. In an irrigating system a main lead pipe a portion thereof bearing above the ground and provided with a section of glass tubing for a sight opening and carrying a strainer at the base thereof and further provided with an escape opening at the extreme end of said pipe, a series of lateral pipes provided with perforations and the extremities bearing above the ground and being provided with valves or suitable small openings to permit the escape of air therefrom, and the combination therewith of gravel pockets located at intervals apart and underneath the surface of the soil designed to be irrigated and through which the lateral pipes pass, all substantially as described and shown.

2. In an irrigating system the combination with a main lead pipe connected with the source of water supply and provided with an escape opening at the extreme end of said pipe, provided with a valve, of a series of laterals provided with perforations in the lower sides thereof and with depending caps bearing over said perforations and suitably secured to the lateral pipes and provided at their extremities with valves bearing above the surface of the ground beneath the surface of which the system is laid, all substantially as described and shown.

3. In an irrigating system a series of gravel pockets laid out at intervals apart and a suitable lead pipe connected with the water supply and a series of laterals bearing through the said gravel pockets underneath the soil and provided with perforations from the lower surface thereof out into the said gravel pockets and being provided with suitable dependent caps secured to said lateral pipes and bearing from the perforations therein and the said laterals bearing out of the ground at their extremities and being provided with suitable valves, all substantially as described and shown.

4. An irrigating system consisting of the pipe C connected with a suitable water supply and valve c for the control of the flow of water there through, and with the glass tube D for sight opening in said pipe, the strainer e therein; the main lead pipe E connected with pipe C by means of pipe C' and provided with an outlet opening at the extreme end thereof which is guarded by the valve h, the laterals F connected with said main lead pipe and provided with valves f therein and having perforations in the lower portions thereof at intervals apart and provided with a valve at their extremities bearing above the ground and with the caps or guards G bearing over the perforations in the said lead pipes secured thereto by means of wires, i, and having the openings g, therein; the gravel pockets H through which the said laterals bear, all substantially as described and shown.

In testimony whereof I affix my signature in presence of two witnesses.

WILLIAM A. LEE.

Witnesses:
ABRAHAM JACOBSON,
W. V. TEFFT.